(12) United States Patent
Gorti et al.

(10) Patent No.: US 8,867,724 B2
(45) Date of Patent: Oct. 21, 2014

(54) DISTINCTIVE RING TONES PROMPTED BY CALL URGENCY AND CONTEXT

(75) Inventors: Sreenivasa Rao Gorti, Austin, TX (US); Stephen Mark Mueller, Austin, TX (US); Jeffrey Lewis Brandt, Cedar Park, TX (US); Huitao Liu, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1711 days.

(21) Appl. No.: 10/930,704

(22) Filed: Aug. 31, 2004

(65) Prior Publication Data

US 2006/0045252 A1 Mar. 2, 2006

(51) Int. Cl.
*H04M 3/42* (2006.01)
*H04W 4/00* (2009.01)
*H04M 3/02* (2006.01)
*H04M 19/04* (2006.01)
*H04W 8/18* (2009.01)
*H04M 1/57* (2006.01)

(52) U.S. Cl.
CPC ........ *H04M 19/041* (2013.01); *H04M 3/42051* (2013.01); *H04M 3/02* (2013.01); *H04M 19/048* (2013.01); *H04W 8/18* (2013.01); *H04M 1/578* (2013.01); *H04M 2203/2038* (2013.01); *H04M 1/576* (2013.01); *H04M 3/42153* (2013.01)
USPC ................................. 379/207.16; 455/404.1

(58) Field of Classification Search
CPC . H04M 3/42017; H04M 19/041; H04M 3/42; H04W 4/16; H04W 4/003; H04W 4/00
USPC .................................. 379/207.16; 455/414.1
See application file for complete search history.

(56) References Cited

U.S. PATENT DOCUMENTS

| 5,740,532 A * | 4/1998 | Fernandez et al. ......... 455/404.1 |
| 6,359,970 B1 | 3/2002 | Burgess |
| 6,418,330 B1 | 7/2002 | Lee |
| 6,650,746 B1 * | 11/2003 | Groen et al. ............. 379/207.16 |

(Continued)

FOREIGN PATENT DOCUMENTS

| DE | 100 52 932 A1 | 5/2000 |
| EP | 1 117 245 A1 | 7/2001 |
| EP | 1 202 547 A2 | 5/2002 |

OTHER PUBLICATIONS

International Search Report and Written Opinion of the International Searching Authority for International Application No. PCT/US2005/030866, Mailed on March 7, 2006.

(Continued)

*Primary Examiner* — Rasha Al Aubaidi
(74) *Attorney, Agent, or Firm* — Toler Law Group, PC

(57) ABSTRACT

Devices, methods and systems for enhanced ringing features on communications terminals. Flexible user-established rules, customized in a subscriber profile database, enable the ring-tone to vary based on caller-id, caller priority, call-urgency (as determined by caller), call context and so forth. Call set-up logic applies the profile rules prior to completing the call set-up. "Buzz-tones" extend the basic distinctive ringing feature to the "silent" mode that is currently available on cell-phones, which is of particular utility to subscribers with hearing disabilities. Other kinds of alerts (audio/motion/visual) like flashing colors on a display, moving pictures and the like, and any combination of notification modes, are contemplated by alternative embodiments.

20 Claims, 1 Drawing Sheet

(56) References Cited

U.S. PATENT DOCUMENTS

| | | |
|---|---|---|
| 7,542,558 B2 | 6/2009 | Klein et al. |
| 8,107,601 B2 * | 1/2012 | Helferich .................. 379/88.22 |
| 2002/0046299 A1 | 4/2002 | Lefeber et al. |
| 2002/0071546 A1 | 6/2002 | Brennan |
| 2002/0128033 A1 | 9/2002 | Burgess |
| 2002/0163999 A1 | 11/2002 | Farris et al. |
| 2003/0032414 A1 | 2/2003 | Melaku et al. |
| 2003/0041048 A1 | 2/2003 | Balasuriya |
| 2003/0223570 A1 | 12/2003 | Partanen et al. |
| 2004/0067751 A1 * | 4/2004 | Vandermeijden et al. .. 455/414.1 |
| 2004/0213401 A1 * | 10/2004 | Aupperle et al. ............. 379/372 |
| 2005/0084082 A1 | 4/2005 | Horvitz et al. |
| 2005/0096008 A1 * | 5/2005 | Shin .......................... 455/404.1 |
| 2005/0151642 A1 * | 7/2005 | Tupler et al. ............. 340/539.18 |
| 2005/0169446 A1 * | 8/2005 | Randall et al. ............. 379/93.23 |
| 2005/0195802 A1 | 9/2005 | Klein et al. |
| 2005/0201362 A1 * | 9/2005 | Klein et al. .................. 370/352 |
| 2006/0094404 A1 | 5/2006 | Burgess |
| 2006/0188084 A1 | 8/2006 | Rogers et al. |

OTHER PUBLICATIONS

Canadian Office Action Dated Jun. 9, 2009.
European Office Action Dated Jun. 14, 2007.
European Office Action Dated Aug. 28, 2008.
European Office Action Dated Jul. 16, 2009.
Notice of Preliminary Rejection for Laid-Open. Patent Application (A), Patent Publication No. 10-2004-0048115; Publication date: Jun. 7, 2004; Application No. 10-2002-0075887; Filing Date: Dec. 2, 2002; received from the Korean Intellectual Property Office (KIPO) mailed on Apr. 10, 2008; English translation; 6 pages.

* cited by examiner

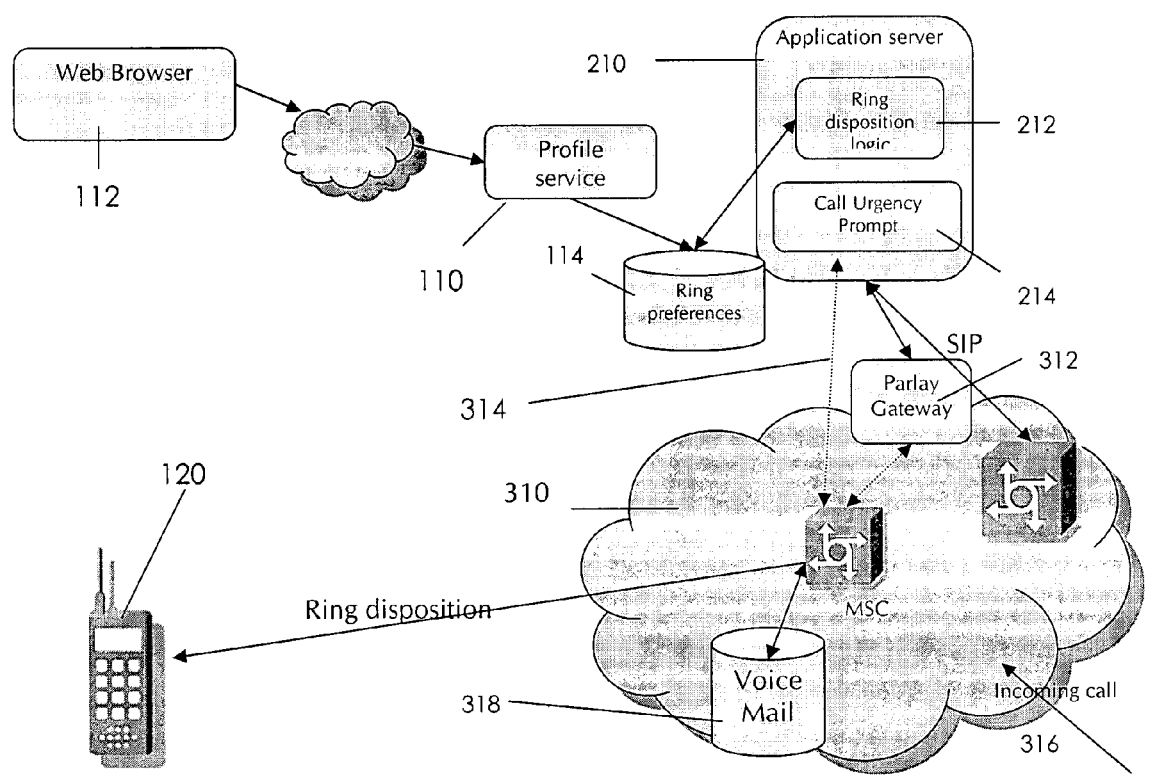

DISTINCTIVE RING TONES PROMPTED BY CALL URGENCY AND CONTEXT

FIELD OF THE INVENTION

The present invention relates to telephones, cordless telephones, cell phones, pagers, and other electrical or radio terminals, and in particular to distinctive modes of notification, such as ring tones, that indicate call urgency or other context of an incoming call or message, together with systems and methods for selecting and implementing the ring tones.

BACKGROUND OF THE INVENTION

A communications terminal, such as a cellular phone or a paging receiver, generates a ring tone (calling tone) or vibrates upon receipt of an incoming call or message, such as a text or an instant message ("IM"), to notify the user of the call receipt. A mobile wireless terminal such as a mobile telephone, for example, has a "terminating ring function" for informing the terminal user of an incoming voice call from other mobile wireless terminals or an incoming data call from various information providing servers. The terminating ring function includes various modes such as a vibration mode or a melody mode that outputs a ring tone to a receiving terminal.

A conventional mobile wireless terminal typically generates a single terminating ring tone designated by the user upon receipt of each incoming call. Mobile wireless terminals store a multiplicity of tones, melodies, or other modes, in its internal memory. Many cell phones support downloading melodies from a melody providing server via the Internet. The downloaded tones can also be stored in the phone's memory.

Not surprisingly, then, distinctive ringing has become a hugely popular feature with consumer and business telephony customers. Present day solutions support caller ID information that triggers the distinctive ringing. The distinctive ring is either network-actuated, i.e., the network sends the appropriate signal to the device, or is actuated by software on the client device.

On mobile phones, for example, the device interprets caller id information associated with the incoming call signal to play an appropriate ring-tone. A user may group calling party contacts and associate one or more ring-tones with each group or person in the device's memory.

BRIEF DESCRIPTION OF THE DRAWINGS

The present invention is further described in the detailed description that follows, by reference to the noted drawing, by way of non-limiting examples of embodiments of the present invention, and in which:

FIG. 1 is a block diagram of a specific embodiment of a notification mode system of the present invention.

DETAILED DESCRIPTION OF THE INVENTION

In view of the foregoing, the present invention, through one or more of its various aspects, embodiments and/or specific features or sub-components, is intended to bring out one or more of the advantages that will be evident from the description. The present invention is described with frequent reference to phones or cell phones. It is understood that a phone is merely an example of a specific embodiment of the present invention, which is directed generically to communication terminals, mobile communication equipment and devices, together with attendant networks, systems and methods within the scope of the invention. The terminology, therefore, is not intended to limit the scope of the invention.

The present invention provides enhanced ringing features. In one or more of its various embodiments, the present invention provides:

(a) a more flexible user-established set of rules, customized in a subscriber profile database, that enables the ring-tone to vary based on caller-id, caller priority, call-urgency (as determined by caller), call context (e.g., is the user currently filtering calls?), and so forth.

(b) call set-up logic that applies the profile rules prior to completing the call set-up. The call set-up logic, for example, enables the subscriber's phone to prompt the calling party to indicate the urgency of the call and to process the caller's reply to the prompt to select the alert or notification mode indicated by the reply.

(c) an ability to play "buzz-tones" to extend the basic distinctive ringing feature to the "silent" mode that is currently available on cell-phones. For example, one buzz may indicate a low-priority call, whereas a buzz-buzz sequence indicates a high-priority incoming call. This feature is of particular utility to subscribers with hearing disabilities.

Other kinds of alerts (audio/motion/visual) like flashing colors on a display, moving pictures (such as an animated cartoon displaying agitation or a sense of urgency) and the like, and any combination of notification modes, are contemplated by alternative embodiments.

Advantages of the present invention include:

1. A simple web interface to input user profile data, policies and preferences. The same profile applies across different modes of telephony such as wireline/wireless communication, text and instant messaging, paging, and so forth. An alternative embodiment provides an Interactive Voice Recognition ("IVR") system for profile data input. The profile can be applied to any type or mode of incoming communication, even in conjunction with call rerouting applications. For example, if the call disposition of a particular subscriber is to always forward to voice-mail, the profile applies to the alert for the receipt of voicemail. Likewise, for call-forwarding, the appropriate notification mode actuates at the end-use terminal of the subscriber, even if the terminal is a wireline POTS phone.

2. Call set-up logic with a highly flexible profile that extends to an arbitrary limit the basic caller-id-triggered notification. That is, the complexity of the notification protocols depends mainly on the ease of setup with the interface, and on the complexity-tolerance of the subscriber, not on any particular technical limitation. In principle, the contingency and contextual factors that differentiate ringing, and the ringing or other notification modes themselves, are readily extendable beyond the examples described herein.

3. Ring-tones to associate buzz-tones, LED flashing, and other kinds of alerts with pre-defined incoming call categories.

4. Auditory, tactile and/or visual cues as to the urgency of the incoming call assure that the subscriber easily detects and recognizes urgent or important calls.

FIG. 1 is a block diagram of a specific embodiment of a notification mode system of the present invention. The system involves three components, broadly speaking. Subscriber related elements are indicated by 100-series identifying numerals, application server elements are indicated by 200 series identifying numerals, and network/routing elements are indicated by series 300 identifying numbers.

Profile service 110 presents a web-based interface (or a device-specific client) 112 to user 120, represented by a mobile phone terminal. User 120 establishes a priority grouping for each contact. Priorities may be as broad as emergency/medium/low, for example, or may specify frequent callers such as kids, husband, wife, office, and so forth, and, moreover, priority categories can be cross referenced to callers in the profile database to further hone the nature of the incoming call.

For example, a matrix position identified as kids/emergency is assigned a notification mode such as loud ringing together with buzzing or vibrating and LED flashing, and indicates an injury requiring attention or transportation, whereas husband/low is assigned a melody or forwarded to voicemail and indicates an addition to a shopping list or a DVD rental request.

The user establishes a set of ring-tone identifiers 114 as discussed above, and defines ring disposition rules with, for example, simple if/then statement logic. That is, IF caller priority=MEDIUM, and caller urgency=HIGH, THEN ring-disposition=IMPORTANT. Ring-disposition rules determined by user availability are also contemplated.

Application server 210 hosts application logic 212 to process profile rules 112 and 14 and determine the caller urgency. To determine the urgency, logic 212 prompts the caller by playing a message to the caller: "The party you have called is currently busy—please indicate if this is an important call by pressing 1 for Yes, or 2 for No."

Alternative embodiments use an IVR system to allow the calling party to just speak YES or NO. The called party can customize the message. To contacts designated as IMPORTANT, for instance, the prompt plays a message to the caller such as "I'm currently busy, but if you indicate that the call is important, I will step out to handle this call."

Application logic 212 accepts network triggers for incoming call 316 either through Parlay Gateway 312 or directly through Softswitch 314. Standard PSTN elements to allow the call to be routed to voice mail 318 or directly to subscriber 120. The signaling protocol to convey the ring-disposition to the subscriber depends on the nature of end-user device 120.

In a standard PSTN device, end-device 120 does not possess any intelligence. The PSTN SSP, therefore, is responsible for producing the distinctive rings through existing mechanisms for distinctive ringing.

In a mobile network, mobile device 120 hosts the application intelligence to select the ring-tone, based on the incoming ring disposition 212, conveyed through the signaling protocols over the air interface between network 310 and mobile device 120. If the ring-tones are hosted on client device 120, a setup procedure allows a subscriber to "tag" different ring-tones with incoming ring dispositions 212.

For example, a code representing the ring-disposition decision from network 310 is appended to the calling party ID in the call setup message. Upon the reception and decoding of this information, the client will then be able to alert user 120 with appropriate methods and signals associated with pre-established ring-disposition 212.

Voice over Internet Protocol ("VoIP") terminals having sufficient intelligence operate analogously to the mobile device case. If, however, the endpoint is a dumb handset attached to a VoIP interface, the interface, rather than a central office, includes the hardware and software necessary to generate ring patterns.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

We claim:

1. A method of processing call data, the method comprising:
    receiving a call from a calling device to a called device at an application server;
    determining, at the application server, a designation of the calling device based on caller identification information;
    sending a prompt for information about urgency of the call to the calling device from the application server based on the designation so that the calling device receives a first prompt when the designation is a first designation and the calling device receives a second prompt different than the first prompt when the designation is a second designation;
    receiving a response to the prompt from the calling device at the application server;
    appending a code to caller identification information in a call setup message to enable a particular notification based on the designation and the response, wherein the code is decodable by the called device to enable the called device to provide one or more of an audio alert, a vibrational alert, and a visual alert; and
    sending the call setup message to the called device.

2. The method of claim 1, wherein the visual alert includes an animated display that indicates urgency.

3. The method of claim 1, wherein the vibrational alert comprises a particular sequence of vibrations to indicate call urgency.

4. The method of claim 1, wherein the called device is a mobile communication device.

5. The method of claim 1, wherein the called device is a voice over internet protocol terminal.

6. The method of claim 1, wherein the designation is based on caller priority groupings.

7. The method of claim 6, wherein the caller priority groupings are based on an expected frequency of calls by potential callers of each priority grouping.

8. The method of claim 1, wherein the prompt for information about urgency of the call is a voice prompt to the calling device and wherein the urgency of the call is provided in response to the voice prompt.

9. A method of processing call data, the method comprising:
    determining caller priority of a calling party based on profile information from a called party at an application server;
    receiving input from the calling party of a call to a called device at the application server in response to a prompt presented to the calling party from the application server after the application server receives the call, the input indicating an urgency of the call from the calling party, wherein the prompt is based on the caller priority so that the calling device receives a first prompt when the caller priority is a first designation and the calling device receives a second prompt different than the first prompt when the caller priority is a second designation;
    determining a notification mode based at least in part on the caller priority and the urgency; and
    when the notification mode is to send a call setup message to the called device:
    appending a code to caller identification information in the call setup message, wherein the code is decodable by the called device to enable the called device to provide one or more of an audio alert, a vibrational alert, and a visual alert; and sending the call setup message to the called device.

10. The method of claim 9, wherein the code enables the called device to provide the audio alert, the vibrational alert, and the visual alert when the urgency indicates an emergency and the caller priority indicates a frequent caller.

11. The method of claim 10, wherein the frequent caller corresponds to one of a child, a husband, and a wife.

12. The method of claim 9, wherein, when the caller priority is determined to be important, the prompt indicates to the calling party that the called party will take the call when the called party indicates that the call is important.

13. The method of claim 9, further comprising forwarding the call to voicemail when the notification mode is to send the call to voicemail.

14. The method of claim 9, further comprising rerouting the call to a second device associated with the called party when the notification mode is to reroute the call.

15. The method of claim 9, wherein the prompt is a voice prompt.

16. The method of claim 9, wherein the code enables the called device to play an audio alert when the urgency indicates low urgency and the caller priority indicates a frequent caller.

17. The method of claim 9, wherein the notification mode is send the call to voicemail when the urgency indicates low urgency and the caller priority indicates a frequent caller.

18. A system comprising:

ring disposition logic to perform operations including:
    receiving a call from a calling device to a called device;
    determining a designation of the calling device;
    sending a prompt for information about urgency of the call to the calling device based on the designation so that the calling device receives a first prompt when the designation is a first designation and the calling device receives a second prompt different than the first prompt when the designation is a second designation;
    receiving a response to the prompt from the calling device;
    determining a notification mode for the call based on the designation and the response; and
    appending a code to caller identification information in a call setup message when the notification mode is to send the call setup message to the called device, wherein the code is decodable by the called device to enable the called device to provide one or more of an audio alert, a vibrational alert, and a visual alert; and
call setup logic to send the call setup message to the called device.

19. The system of claim 18, further comprising call routing logic to select a communication terminal to which the call setup message is sent when the notification mode is to send the call setup message to a device other than the called device.

20. The system of claim 18, wherein the call setup logic sends the call to voicemail when the notification mode is voicemail.

* * * * *